(No Model.)  2 Sheets—Sheet 1.

P. M. THOMPSON.
HAY RAKE AND LOADER.

No. 522,629.  Patented July 10, 1894.

WITNESSES:
Chas. Nida.
C. Sedgwick

INVENTOR
P. M. Thompson
BY Munn & Co.
ATTORNEYS.

(No Model.)  2 Sheets—Sheet 2.
P. M. THOMPSON.
HAY RAKE AND LOADER.
No. 522,629.  Patented July 10, 1894.
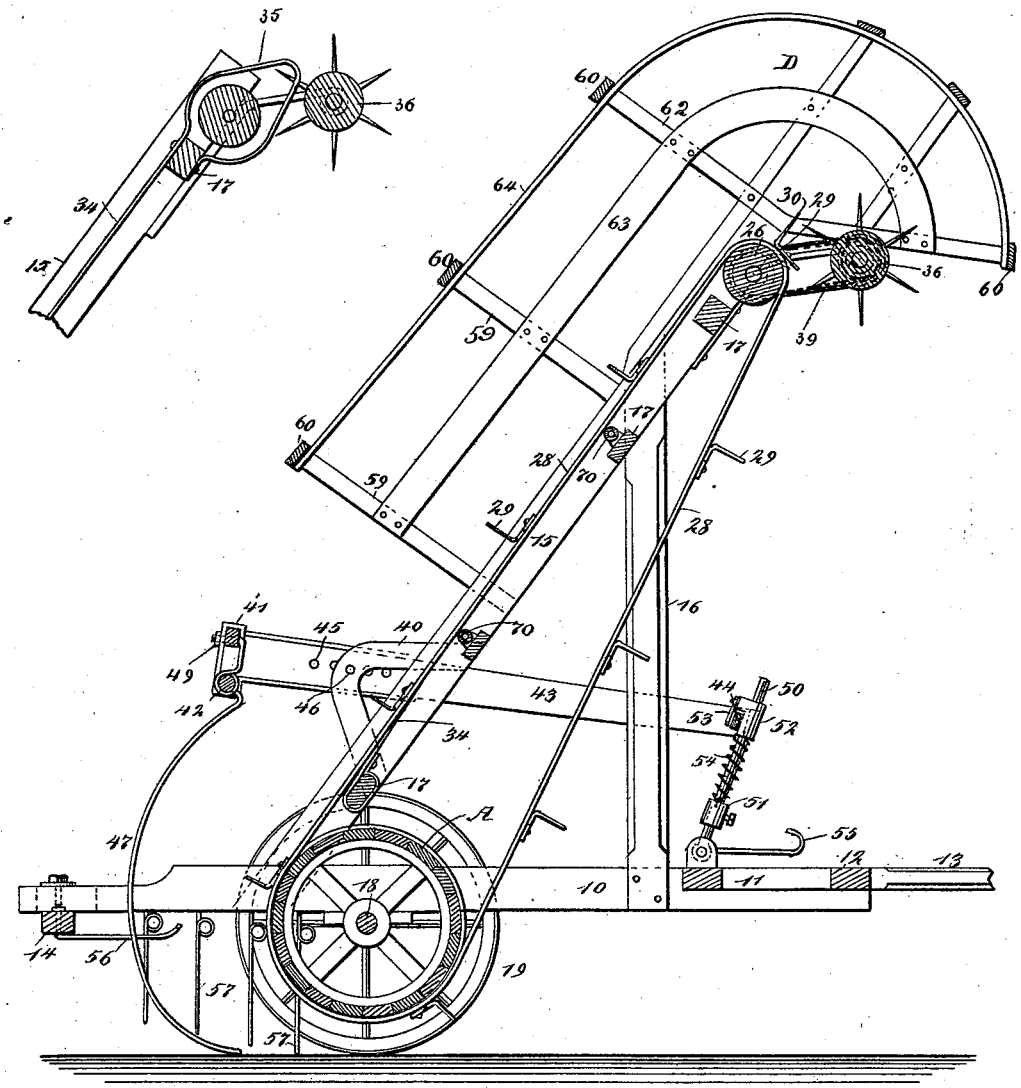
WITNESSES:
Chas. Nida.
C. Sedgwick.
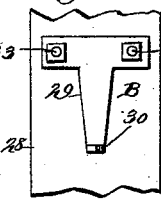
INVENTOR
P. M. Thompson
BY
Munn & Co.
ATTORNEYS.

UNITED STATES PATENT OFFICE.

PETER M. THOMPSON, OF ANACONDA, MONTANA.

HAY RAKE AND LOADER.

SPECIFICATION forming part of Letters Patent No. 522,629, dated July 10, 1894.

Application filed April 3, 1893. Serial No. 468,853. (No model.)

*To all whom it may concern:*

Be it known that I, PETER M. THOMPSON, of Anaconda, in the county of Deer Lodge and State of Montana, have invented a new and useful Improvement in Hay Rakes and Loaders, of which the following is a full, clear, and exact description.

My invention relates to an improvement in hay rakes and loaders, and it has for its object to provide a device of simple, durable and economic construction, and also to provide a means whereby the teeth will accommodate themselves to undulating ground and wherein the teeth may be expeditiously raised and lowered and adjusted to or from the elevator.

A further object of the invention is to construct the elevator in such manner that it will operate effectively to carry the hay or straw from the lower portion of the loader to the upper portion thereof and distribute the hay or straw without any retarding movement of the distributing roller.

Another feature of the invention is to construct the elevator in such manner that it may be quite light yet durable, and the straw will not drop therefrom while being carried upward.

A further feature of the invention consists in the construction of the hood over the upper portion of the machine, which will serve to guide large masses of hay over the top portion of the elevator.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
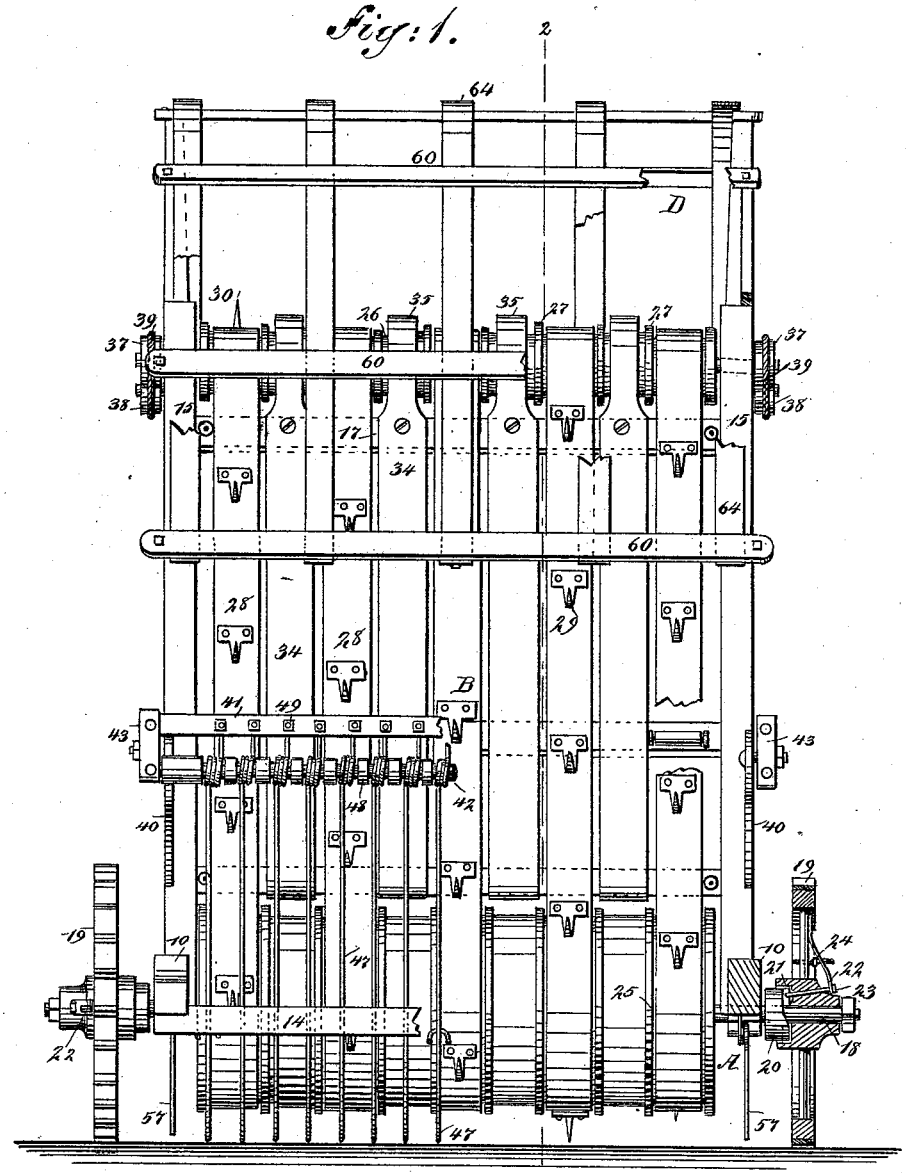
Figure 6:
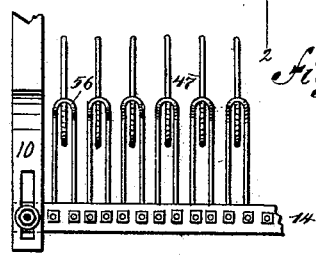

Figure 1 is a rear elevation of the hay loader, a portion of the rake head being broken away and also the head carrying the guides for the rake teeth. Fig. 2 is a vertical longitudinal section taken on the line 2—2 of Fig. 1. Fig. 3 is a detail sectional view of the upper portion of the hay loader, illustrating the fender located at that point. Figs. 4 and 5 are detail views, illustrating the manner in which the teeth of the elevator are attached to it; and Fig. 6 is a detail view of the guides for the rake teeth.

In carrying out the invention the frame of the machine consists of an upright and a base structure, one supported upon the other. The base structure is made somewhat rectangular in general contour and is skeleton in form, comprising horizontal side bars 10 of proper length connected at the front by two cross bars 11 and 12, and to these cross bars a tongue 13, is secured, the rear portion of the frame being connected by an adjustable cross bar 14; that is to say, this rear cross bar may be made, in any suitable or approved manner, adjustable longitudinally of the side bars. The upper structure consists of two parallel side beams 15, inclined with respect to the base, the lower ends of the side beams being secured to the equivalent portions of the base structure between the center and rear end of the base; and the inclination of the said beams 15 is upward and forward, they being supported near their upper ends by uprights or standards 16, attached to them and to the base. The formation of the upper structure is completed by securing to the side bars 15 thereof any desired number of cross bars, the said cross bars being designated in the drawings as 17.

Adjacent to the junction of the upright structure with the base a drum A, is located in the latter, the trunnions 18 of the drum being journaled in suitable boxes located upon the side beams or bars of the base and extending outward beyond the latter. The trunnions of the drum are adapted to carry the supporting wheels 19 of the machine. These wheels are loosely mounted upon the trunnions; therefore the trunnions virtually constitute the axles of the machine. The supporting wheels are likewise adapted as drive wheels, and their peripheral surfaces are roughened in order that they may take fast hold upon the ground.

The supporting and driving wheels have a clutch connection with the axle, and the preferred form of clutch is that illustrated in Fig. 1, in which it will be observed that upon each trunnion or axle a collar 20, is firmly attached, and this collar in its outer face is preferably provided with one or more recesses 21, or projections as may be desired, and the hub of the wheel adjacent to the collar is provided with a recess in which the recessed portion of the collar enters so as to be protected from the weather and from dust.

A spring 22, is secured in any suitable or approved manner at one end to the spoke of the wheel near the felly thereof. The lower end of the spring is free, and has attached to it a pin 23, which pin has free movement in an opening produced in the hub, extending through from its front to its rear face; and the pin 23 is adapted to engage with the studs upon the collar 20, when studs are used, or to enter the recesses therein. Normally the spring 22, will keep the pin in engagement with the collar. Thus when the wheel is placed upon the axle and the spring is permitted to act, as soon as the machine is drawn forward or carried backward the pin will enter one of the recesses or will engage with one of the studs of the collar and cause the collar to revolve, and therefore the axle and the drum, but when it is desired to stop the movement of the drum it may be effected through the medium of a bolt 24. This bolt is preferably made to turn in a threaded bushing inserted in a spoke. Where the thread of the bolt terminates near the outer end of the bolt a shoulder is produced and the outer end of the bolt is passed through an aperture in the spring, the shoulder of the bolt resting against the inner surface of the spring. The outer end of the bolt is squared to receive a key. By manipulating the key the clutch pin may be carried to or from an engagement with the shaft collar 20, and the elevator set in motion or stopped.

The drum is provided with a series of annular ribs 25, produced thereon at given intervals apart; and in the upper end of the upper structure a small drum 26, is journaled the said drum being provided with corresponding annular ribs 27, as shown in Fig. 1.

The elevator is constructed of a series of endless strips 28, of canvas, rubber, or other equivalent material, and these strips are passed over the drums between their alternate sets of flanges, the outer endless strips or belts being located at the end portions of the drums. When the drums are revolved the endless carrier belts are revolved also, and each carrier belt is provided with a set of longitudinally arranged teeth B. These teeth are angular or L-shaped in construction, comprising a body member 29, preferably of somewhat T-shape, which body member is adapted to lie upon the belt, and a pointed member 30, adapted to stand outward at a right angle from the belt. The teeth are placed at predetermined intervals upon the belts and are located upon their outer faces, and as shown in Figs. 4 and 5, the preferred means for attaching these teeth consists in placing upon the inner face of the belt, back of the head portion of the horizontal member of each tooth a washer 31, of metal or other approved material; and bolts 32, are passed through suitable openings in the washers and through openings made in the end portions of the heads of the teeth, and the outer projecting ends of the bolts are provided with suitable nuts 33.

It will be observed that owing to the alternate arrangement of the carrier or conveyer belts upon the drums spaces are formed between the belts, through which the straw, hay or other material to be carried up might pass downward and become wasted. These spaces, however, are closed through the medium of metal strips 34, the strips being secured at their lower ends in any suitable or approved manner to the lower cross bar 17 of the upper structure, which cross bar is located as near as possible to the upper portion of the lower drum. The strips are then carried upward parallel with the belts and are secured to the upper cross bar 17 of the structure, the attachment being made to the upper face of that bar, as shown in Fig. 3; and from this bar the strip is carried upward over and around the upper drum 26, in such manner as not to interfere with the said drum, forming a loop 35. In fact the loop is made preferably of somewhat oblong shape, and extends downwardly and rearwardly in front of the upper drum. The metal strip after having been manipulated to form the loop is secured preferably to the under face of the upper cross bar 17. The loop 35, is adapted to cause the hay or straw to be released practically from the teeth of the conveyer or elevator belts when the teeth reach the upper drum, and to facilitate the delivery of all of the material carried up over the upper end of the machine; and the loops also serve to prevent any material from being carried back again, or falling back upon the conveyer.

When the hay or straw passes over the top of the machine it is conveyed by the loops 35 to a spiked roller 36, journaled in suitable bearings slightly above and in advance of the upper end of the machine proper. This roller is adapted to receive the straw or hay and deliver it to a wagon to which the loader may be attached; and to insure the delivery of all the straw or hay to the wagon, as without such roller part of the hay or straw might fall to the ground. The spiked roller is preferably made to revolve at greater speed than the upper drum, but it is driven from that drum, and to that end a pulley 37, is mounted upon each trunnion of the said upper drum, and a second pulley 38, is mounted upon each end of the spiked roller, the pulleys being connected by suitable belts 39.

Near the lower end of the upper structure at each side a bracket 40, is located, the said brackets being somewhat of angular construction, preferably, and they extend upward and outward in a rearward direction beyond the upper faces of the side beams of the said structure. These brackets are adapted to serve as fulcrums for the rake head, and the said rake head consists of an upper bar 41, which may be of wood, metal or any approved material and is preferably made rectangular in cross section, and a lower bar or bulk-head 42, which is of metal and preferably round in cross section. These two members 41 and 42 of the head are spaced some distance apart, and have their ends secured in any suitable or approved manner in what may be termed side arms 43, as the arms extend from the ends of the rake head forwardly at each side of the machine to a point in front of the standards 16, the front ends of the arms being connected by a cross bar 44. Through the medium of the arms the rake head is fulcrumed upon the frame of the machine. Each arm is provided with a series of apertures 45, and one of the apertures of an arm is adapted to be brought into registry with an aperture 46, in the bracket 40 near that arm; a bolt of suitable description is passed through each registering aperture, and by this means the rake is pivotally connected with the upper structure, and by reason of the number of apertures 45 in the arms 43 it is evident that the rake teeth carried by the rake head may be brought as near as may be found desirable to the lower drum, or carried as far from it as may be found necessary, the distance being regulated by the amount of straw to be delivered by the rake to the elevator.

The rake teeth 47, are curved downwardly around the rear portion of the drum, the lower portion of the teeth facing in direction of the front of the machine. The upper ends of the teeth are coiled two or more times around the bulk-head 42, as shown in Fig. 1, the teeth being separated by washers 48, of suitable thickness located upon the bulk-head. Preferably, however, the teeth, which are made of spring wire, are each made to coil three times around said bulk-head, and the upper ends of the teeth are carried from the bulkhead forwardly and upwardly and are passed through suitable apertures made in the upper bar or member 41 of the rake head, the outer ends of the teeth at their tops being provided with suitable nuts 49, by means of which they are held in place.

The rake head is adapted to have engagement with a device whereby the degree of downward pressure upon the teeth may be regulated, and whereby also should the teeth engage with any obstruction they may yield upwardly without sustaining injury, pass the obstruction and be automatically forced downward again. This is accomplished by pivoting the lower end of a rod 50 upon the inner forward cross bar 11. The rod is provided with a sleeve 51, capable of sliding thereon yet of being held firmly upon the rod through the medium of a set screw, as shown in Fig. 2. A second sleeve 52, is located near the upper end of the rod, and also has sliding movement thereon. The upper sleeve is somewhat angular or of inverted L-shape in general contour, its shorter member being provided with a button 53, or like device, and when the button is thrown downward the forward cross bar 44 of the rake head is to be received between the said button and the rear face of the upper sleeve. The two sleeves are connected by a spring 54. The upper sleeve 52, works loosely upon the rod 50 in order to accommodate itself to the movements of the rake; and the spring 54, causes a constant downward tension to be exerted upon the rake teeth. If it is desired to increase the pressure or tension on the rake the lower sleeve is loosened and is carried upward against the tension of the spiral springs and is again fastened to the rod 50. If it is desired to raise the rake entirely from the ground, the forward bar of the rake head is relieved from engagement with the tension device just described and is carried downward and is engaged by a hook 55, located at the forward portion of the machine frame. Thus when the forward end of the rake head is depressed its rear end will be elevated, and consequently the teeth will be held above the ground. Each rake tooth passes through a guide loop 56, in order to free it from hay. These loops are projected horizontally forward from the rear cross bar 14 of the base frame, and their forward ends are curved slightly upward; and when the rake head is adjusted to carry the teeth of the rake to or from the lower drum the bar 14, carrying the guide loops is adjusted in the same direction.

In order to prevent the hay from escaping at the sides of the base, that is, at the ends of the rake, spring teeth 57, are projected vertically downward from the side beams of the base structure, and these teeth are graduated in length, the forward ones being longer than the rear ones. The teeth extend from a point opposite the ends of the drum to a point at the rear of the base beyond which the teeth of the rake will not be rearwardly adjustable.

A hood D, is located over the upper portion of the machine, and this hood consists of a series of stanchions 59, projected from the side beams of the upper structure above the rake head. These stanchions are connected by cross bars 60, and at the upper end of the machine at each side, angular stanchions 62, are located, one member extending upward and rearward and the other extending downward and forward over the spiked roller 36. All of the stanchions are connected by cross bars 60, and each side set of stanchions is further connected by side rails 63, extending from the rear of the forward stanchions at any point between their tops and bottoms, and any desired number of these rails may be employed.

In addition to the side rails longitudinal rails 64, are employed to form the roofing of the hood; and the longitudinal bars or slats 64, extend from the rear cross bar to the forward one at proper intervals apart. This hood section protects the straw, preventing it from being blown from the elevator or conveyer, and at the same time it assists in guiding the straw to the point of proper delivery from the machine.

In order to facilitate the movement of the endless belts of the elevator or conveyer, friction rollers 70, are placed upon the intermediate cross bars 17, as shown in Fig. 2, and the belts on their upward stretch pass over these rollers; the friction rollers may likewise be so placed upon the frame of the machine that they will engage with the outer edges of the outer belts of the elevator.

Having thus described my invention, I claim as new and desire to secure by Letters Patent—

1. In a hay rake and loader, the combination, with an elevator consisting of a series of tooth-carrying endless belts, a driving mechanism for operating the belts, and a spiked roller located adjacent to the upper end of the elevator, of rigid strips or slats interposed between the belts, the said strips having extensions looped over the upper supports of the belts and projecting eccentrically from the said supports toward the spiked roller, as and for the purpose set forth.

2. In a hay rake and loader, the combination, with an elevator, of a rake the fulcrum of which is capable of being shifted longitudinally of the rake, whereby the rake teeth may be carried longitudinally of the machine to or from the elevator, as and for the purpose specified.

3. In a hay rake and loader, the combination, with an elevator, of a rake having side arms provided with apertures located in longitudinal alignment, and a bolt adapted to be passed through the said apertures and into the elevator frame to form a pivot for the rake, whereby the said pivot may be shifted longitudinally of the rake to carry the teeth thereof to or from the elevator, as and for the purpose specified.

4. In a hay rake and loader, the combination, with an elevator and its frame, of a rake head provided with side arms having a fulcrum upon the frame of the elevator, said fulcrum being capable of being shifted longitudinally of the side bars and a tension device connected with the front ends of the said side bars, as and for the purpose specified.

5. In a hay rake and loader, the combination with an elevator and its frame, of a rake head having a rocking support adjustable to and from the rear end of the rake head, a sleeve arranged in operative engagement with the front end of the rake head to press the rake down, a rod on which said sleeve is loosely held, the rod being pivoted to the frame of the machine, another sleeve adjustably held on the rod, and a spring connecting the said sleeves, as and for the purpose set forth.

6. In a hay rake and loader, the combination, with an elevator and its frame, and brackets projected from the frame of the elevator, of a rake head carrying spring teeth extending downwardly adjacent to the bottom of the elevator, arms connected with the rake head, extending rearwardly at each side of the frame, the said arms being provided with a series of apertures adapted for registry with apertures in the brackets and a bolt adapted to be passed through the said apertures of the brackets and the arms to form a fulcrum for the latter, whereby the fulcrum may be shifted longitudinally of the said arms and the rake teeth adjusted to or from the elevator, as and for the purpose specified.

7. In a hay rake and loader, the combination, with a frame and an elevator carried by the frame, of a rake head having a shifting fulcrum upon the elevator frame, adjustable guide loops through which the rake teeth pass, and a tension device adapted to exert downward pressure upon the teeth of the rake, as and for the purpose set forth.

8. In a hay rake and loader, the combination, with an elevator and its frame, of a rake adjustably located adjacent to the elevator, and teeth carried downward from the elevator frame between the elevator and the end teeth of the rake, as and for the purpose specified.

9. In a hay rake and loader, the combination with the elevator and its frame, of a rake, arms supporting the same and having a fulcrum that is adjustable longitudinally of the rake arms whereby the rake may be carried longitudinally of the machine, and guide loops through which the rake teeth pass, said loops being adjustable longitudinally of the machine, as and for the purpose set forth.

PETER M. THOMPSON.

Witnesses:
WM. E. THOMAS,
C. ANDERSON.